United States Patent
Chinitz et al.

[11] Patent Number: 6,115,388
[45] Date of Patent: *Sep. 5, 2000

[54] ESTABLISHMENT OF MULTIPLE LOW-RATE INBOUND SIGNALING LINKS IN CDMA DISPATCH SYSTEM

[75] Inventors: Leigh M. Chinitz; Michael L. Needham, both of Palatine; Timothy J. Wilson, Rolling Meadows, all of Ill.

[73] Assignee: Motorola, Inc., Schaumburg, Ill.

[ * ] Notice: This patent is subject to a terminal disclaimer.

[21] Appl. No.: 08/959,327

[22] Filed: Oct. 28, 1997

[51] Int. Cl.$^7$ .............................. H04B 7/216; H04B 7/00; H04L 12/16; H04Q 11/00
[52] U.S. Cl. .......................... 370/441; 370/342; 370/335; 370/266; 455/518
[58] Field of Search ...................................... 370/320, 322, 370/328, 329, 330, 331, 335, 342, 441, 266; 455/518

[56] References Cited

U.S. PATENT DOCUMENTS

| | | |
|---|---|---|
| 5,295,152 | 3/1994 | Gudmundson et al. . |
| 5,724,648 | 3/1998 | Shoughnessy et al. . |
| 5,768,684 | 6/1998 | Grubb et al. . |
| 5,781,536 | 7/1998 | Ahmadi et al. . |
| 5,914,958 | 6/1999 | Chinitz et al. ........................ 370/441 |
| 6,005,848 | 12/1999 | Grube et al. ............................ 370/266 |

*Primary Examiner*—Huy D. Vu
*Assistant Examiner*—Kevin C. Harper
*Attorney, Agent, or Firm*—George C. Pappas; Jeffrey K. Jacobs

[57] ABSTRACT

A quality dispatch service on a CDMA based wireless system. To achieve spectral efficiency and fast access for follow-up calls, in response to a request by a talkgroup member to have a group call established, the non-requesting (listening-only) members are allowed to establish a low-rate (non-voice) signaling link in the reverse direction (inbound) for the limited purpose of (i) providing forward power control information to the fixed infrastructure; (ii) requesting soft hand-off when required; and (iii) maintaining the correct reverse link power control to allow for fast channel access for a follow-on call. In accordance with the illustrative embodiment, the establishment of low-rate inbound signaling links occurs prior to beginning the voice communications. Because a low-rate signaling link, as contemplated by the present invention, is a non-voice link which signals at a predetermined rate substantially less than that of a full-rate traffic link, proportionately less average power is required for dispatch communications than would otherwise be the case if full-rate traffic links were provided instead to non-talking talkgroup members. The present solution results in less interference to the CDMA system and thus substantially less impact on overall system capacity.

15 Claims, 5 Drawing Sheets

ESTABLISHMENT OF MULTIPLE LOW-RATE INBOUND SIGNALING LINKS IN CDMA DISPATCH SYSTEM

REFERENCE TO RELATED APPLICATION

Related subject matter is disclosed in co-pending, commonly assigned patent application entitled, "Fast Call Setup in a CDMA Dispatch System", attorney docket number CM03822H, filed on even date herewith.

1. Field of the Invention

The present invention relates generally to the field of wireless communications, and more particularly, to code division multiple access (CDMA) communication systems and dispatch group call communication systems.

2. Background of the Invention

A typical dispatch two-way radio communication system comprises communication units, communication resources, communication sites, and a communication resource allocator. Each of the sites have a substantially distinct coverage area and are geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

The communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in each site to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talkgroup members are typically in a listen only mode (i.e., not able to transmit when another member is talking) and thus are not allocated a dedicated reverse link. In a TDMA system, for example, time slots are allocated to different users. A talkgroup member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as CDMA, has achieved much higher bandwidth efficiency for a given wireless spectrum allocation, and hence has proved to be an excellent alternative for serving large populations of multiple access users, than analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a conventional dispatch system. Current CDMA systems employ a form of forward power control. This means that, in a typical one-to-one (cellular) conversation, the communication unit periodically informs the base station how well it is receiving the outbound signal. If possible, the base station reduces its outbound power. If necessary, the base station increases its outbound power. This communication between the base station and the communication unit requires a two-way communication link between the two. In a dispatch situation, the most intuitive outbound power control scheme is for the base station to respond to requests to increase the power coming from any unit which requires it. However, this can only occur if all units involved in the dispatch call have an established two-way communication link.

CDMA systems also use soft hand-off at cell (site) boundaries which, in a dispatch setting, would require each of the listening units to signal the base station when another cell is found to have sufficient (usually greater) signal strength to handle the call as the communication unit migrates away from the base station, and closer to another base station. In turn, the base station will enable the now closer base station to both send and receive the same traffic to and from the migrating communication unit. In order for this procedure to take place, the communication unit must have a communication path in to the fixed end.

Reverse power control is another important aspect of CDMA systems. (In fact, this is much more important than forward power control.) Reverse power control attempts to equalize the received signal powers for all communication units controlled by a particular base station. By having the base station monitoring (and accordingly vary) power from listening communication units, the efficiency of CDMA is realized.

In order to avoid excessive interference on the reverse link, communication units accessing the channel for the first time (i.e., before reverse power control has been established) use what is known as "access probes". This means that they access the channel with low power, and slowly ramp up their power until a response from the fixed end tells them that their signal has been received. For cellular communications, the time delay caused by this access method is insignificant. On the other hand, the time delay in setting up a link for a follow-up call during a dispatch group call would be significant and must necessarily have been established in advance. In dispatch, any one of the talkgroup members may want to send an inbound message and then drop back to listening status. If each access required access probes, the delay would be intolerable for a quality dispatch service.

As stated above, non-CDMA systems do not have multiple reverse link connections in a dispatch call because the nature of the access methodology (TDMA or FDMA) does not demand it (quality dispatch functionality is possible for listening units without the power control and soft hand-off required in CDMA systems). TDMA and FDMA systems assemble a talkgroup by alerting the members of the call, and informing them of where to tune to listen to the call. The establishment of multiple reverse (inbound) signaling links is simply not an issue. For CDMA systems, there are to date only point-to-point communication protocols established (i.e., dispatch capability has never been deployed). Therefore, the establishment of multiple reverse signaling links and the conflict that this can cause with the strict timing requirements of a dispatch service have not been addressed.

A hybrid TDMA/CDMA system indirectly addressing the delay problem with CDMA channel access was proposed in U.S. Pat. No. 5,295,152, entitled "TDMA for mobile access in a CDMA system". In the proposed system, a separate TDMA channel is defined, either separated in frequency band or time interleaved in the same frequency band as the CDMA channel. Because TDMA does not require stringent inbound power control, immediate access on the TDMA channel portion is possible without the access probe delays seen in CDMA. This TDMA channel could therefore be used for access and control signaling (e.g., fast follow-up in a dispatch call), while the CDMA portion of the system would be used for the traffic channels. Such a hybrid approach, however, would require essentially two different types of radio equipment (TDMA and CDMA) at the base and mobiles ends, leading to higher costs, and may present interference problems to nearby, pure CDMA systems.

Providing all listening-only units on a CDMA system with a full traffic capable reverse link would quickly deteriorate system performance in a heavy user system due to excessive interference and would be a great waste of resources. CDMA systems are interference limited, in that capacity is determined by the amount of interference due to all the users on the system. An alternative might be to set up non-talking group members in a listen-only mode with no reverse link whatsoever. However, this latter scenario would lead to serious difficulties with forward power control, soft hand-offs, and rapid channel access for the follow-on calls in the dispatch conversation (group call).

It would be a great advancement in the art of dispatch communications to be able to provide quality dispatch service on a CDMA based wireless system.

Reverse links are necessary in a CDMA dispatch system since such links provide to listening group call members the means for inbound power control to enable fast access in response to the dispatch call, the means for outbound power control, and the means for enabling soft hand-off. The establishment of these links, however, could seriously impact the call setup time, and thus service quality. There is also a further need therefore for a CDMA based wireless system which establishes reverse links for all talkgroup members participating in a dispatch call but that does so without seriously negatively impacting the call set up time and thus service quality.

DETAILED DESCRIPTION OF THE PREFERRED EMBODIMENTS

Generally, the present invention involves providing quality dispatch service on a CDMA based wireless system. To achieve spectral efficiency and fast access for follow-up calls, in response to a request by a talkgroup member to have a group call established, the non-requesting (listening-only) members are allowed to establish a low-rate (non-voice) signaling link in the reverse direction (inbound) for the limited purpose of (i) providing forward power control information to the fixed infrastructure; (ii) requesting soft hand-off when required; and (iii) maintaining the correct reverse link power control to allow for fast channel access for a follow-on call. In accordance with a first illustrative embodiment, the establishment of low-rate reverse links occurs prior to beginning the voice communications. Because a low-rate signaling link, as contemplated by the present invention, is a non-voice link which signals at a predetermined rate substantially less than that of a full-rate traffic link, proportionately less average power is required for dispatch communications than would otherwise be the case if full-rate traffic links were provided instead to non-talking talkgroup members. The present solution results in less interference to the CDMA system and thus substantially less impact on overall system capacity.

In an alternative illustrative embodiment, the establishing of multiple reverse links in a CDMA dispatch call occurs as a background process while beginning the voice communications immediately.

Figure 1:
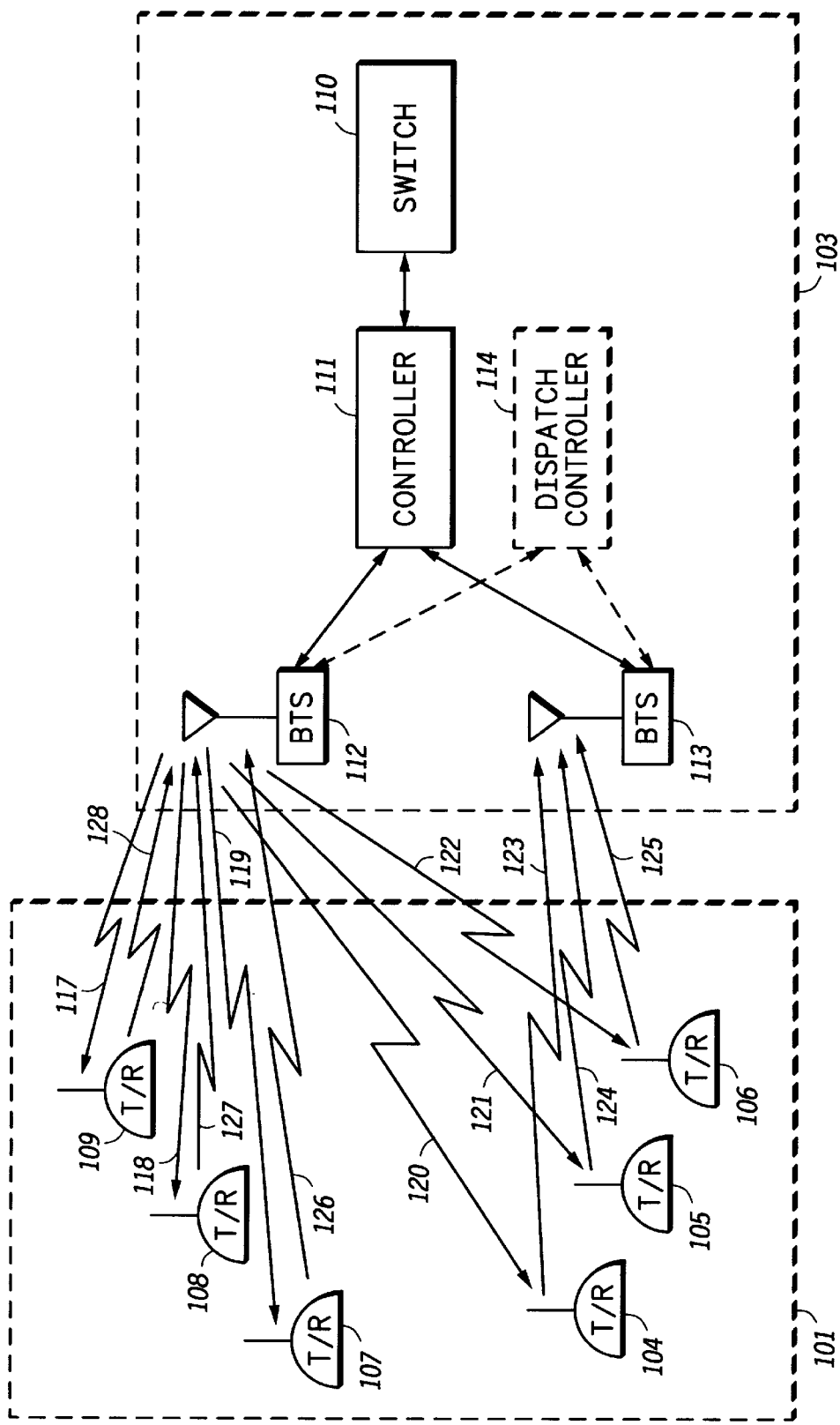
FIG. 1 is a block diagram of a CDMA based wireless dispatch communication system in accordance with the present invention.

The present invention can be more fully described with reference to FIGS. 1–5. FIG. 1 is a block diagram of a wireless communication system 100 in accordance with the present invention. The wireless communication system 100 is a CDMA system, as known in the art, and comprises a plurality of subscriber units 104–109 arranged into at least one talkgroup 101 in wireless communication with a fixed infrastructure 103. In the illustrative embodiment, each of the subscriber units is physically capable of duplex communications.

Communication channels 117–128 are effectively provided through the use of codes, often referred to a pseudo-random noise (PN) sequences in conventional cellular CDMA systems. As described in further detail below, an outbound code is used to effectively provide outbound communication channels (forward links) 117–122 to each subscriber unit in the talkgroup 101. Additionally, inbound codes are used to effectively provide inbound communication channels (reverse links) 123–128 to each subscriber unit in the talkgroup 101. Use of PN codes to establish a communication link between the fixed infrastructure 103 and a given subscriber unit is well known in the art of CDMA and forms no part of the invention.

The fixed infrastructure 103 comprises those elements normally required to support communications within the wireless system 100 and, in the preferred embodiment, conforms to a typical CDMA architecture. In particular, fixed infrastructure 103 comprises a switch 110 in communication with a controller 111 that, in turn, is in communication with base transceiver systems (BTSs) 112–113. The switch 110 (often referred to as a Mobile Switching Center or MSC), controller 111 (often referred to as a Base Station Controller or BSC) and BTSs 112–113 are all well known in the art. In practice, switch 110 typically communicates with more than one controller, and may communicate with other equipment not shown. For purposes of simplicity, fixed infrastructure 103 has been limited as shown in FIG. 1.

Fixed infrastructure 103 may also optionally include a dispatch controller 114 in communication with BTSs 112–113. A suitable dispatch controller 114 is the Dispatch Application Processor used in the "iDEN" wireless communication system manufactured by Motorola, Inc. The management of group call processing is preferably handled by the controller 111 or, if available, by the dispatch controller 114. Additionally, the functionality of group call handling, as described below, may be distributed throughout the fixed infrastructure 103.

Figure 2:
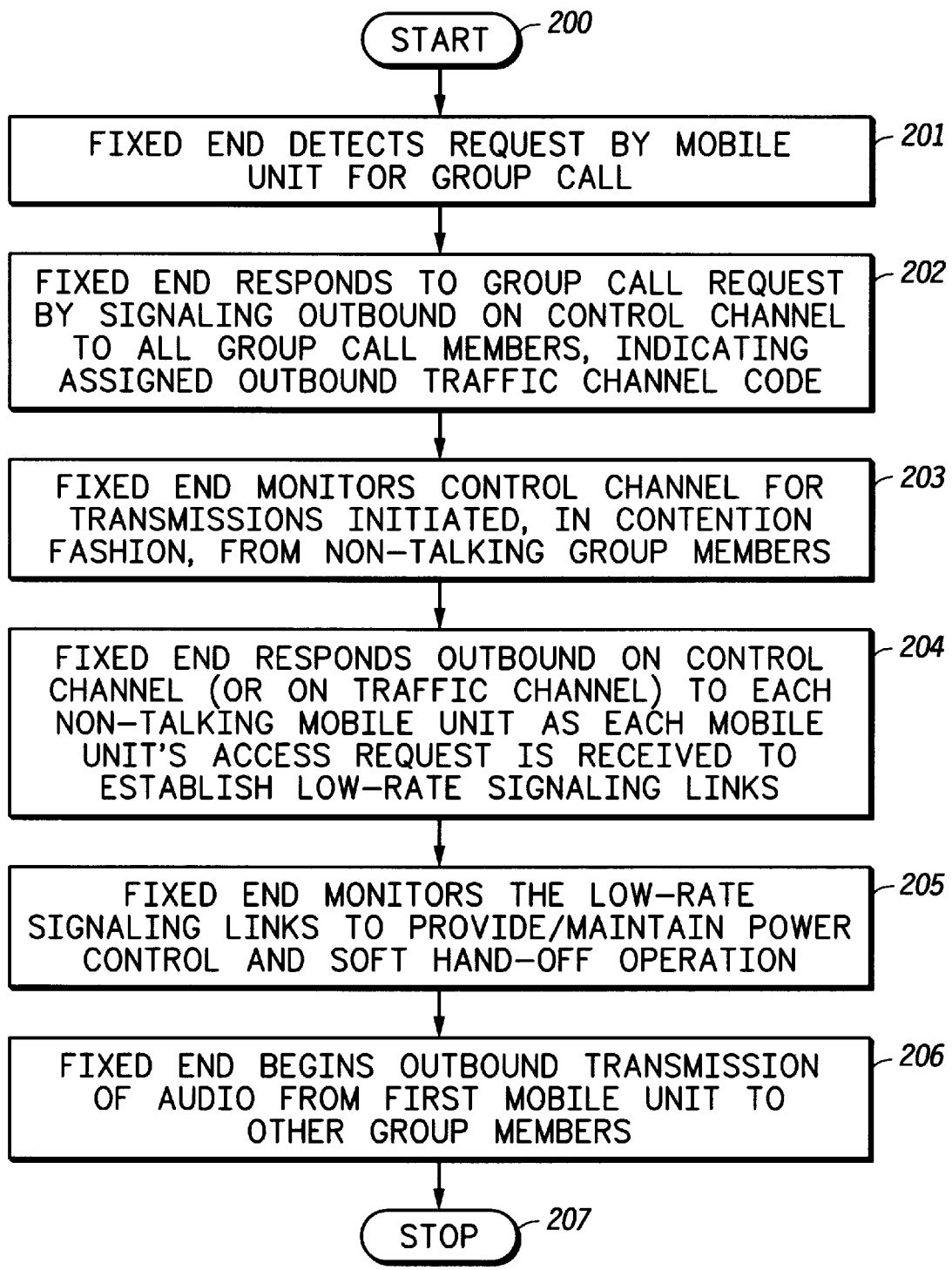
FIG. 2 is a flow chart illustrating a method for use by the fixed infrastructure in accordance with a first illustrative embodiment of the present invention.

FIG. 2 is a flow chart illustrating the method for use by the fixed infrastructure 103. Although the method described in FIG. 2 is generally implemented by the fixed infrastructure 103, the method is preferably carried out by the controller 111 or by the dispatch processor 114, if available. Also, the functionality illustrated in FIG. 2 is implemented in as stored software routines that are executed by the platforms in which the software is stored.

Referring to FIG. 2, there will now be described a first illustrative embodiment relating to the establishment of low-rate inbound (reverse) links prior to beginning the voice communications in a quality CDMA dispatch environment.

The fixed infrastructure 103 (generally also referred to as the "fixed end") detects a request by the subscriber unit of the first group member for a group call (201). This typically involves a first mobile or subscriber unit whose user is a member of the talkgroup initiating a group call by signaling inbound on a common access channel (generally also referred to as a "control channel"). The fixed end 103 responds to the group call request by signaling outbound on a control channel to all group call members, indicating assigned outbound traffic channel code (202). Before the fixed end begins outbound transmission of audio to all group call members (206), it begins monitoring a control channel for transmissions initiated, in contention fashion, from the non-talking group members attempting to establish a low-rate inbound link (203), by notifying the fixed end of their unique PN code; for purposes of participating in the group call.

The fixed end responds outbound on a control channel (or on the assigned full-traffic outbound link) to each non-talking mobile unit as each mobile unit's request is received, indicative that a low-rate inbound signaling link has been established (204). The fixed end then monitors the low-rate inbound signaling links using the unique PN codes of participating non-talking group members to provide and maintain power control and/or soft hand-off operation (205). After sufficient time, to allow all interested group members to establish low-rate inbound signaling links, the fixed end begins outbound transmission of audio from the first subscriber unit/talkgroup member to the all group members (206).

It should be appreciated that because the subscriber units only establish a low-rate inbound signaling link while in the listening mode, system power and bandwidth resources are significantly better utilized than if a full-traffic inbound signaling link were established.

Figure 3:
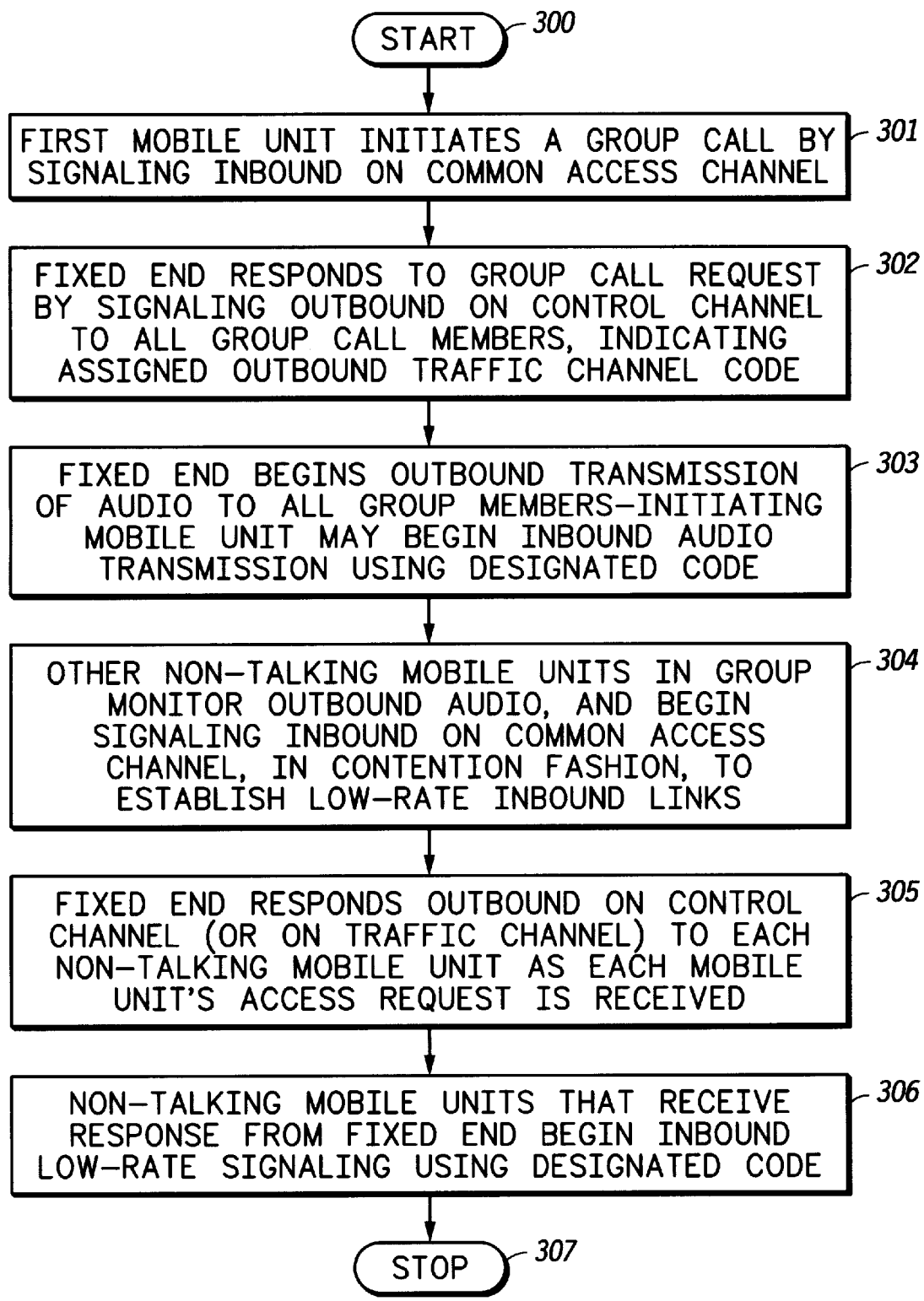
FIG. 3 is a flow chart illustrating a second illustrative embodiment of the present invention.
Figure 4:
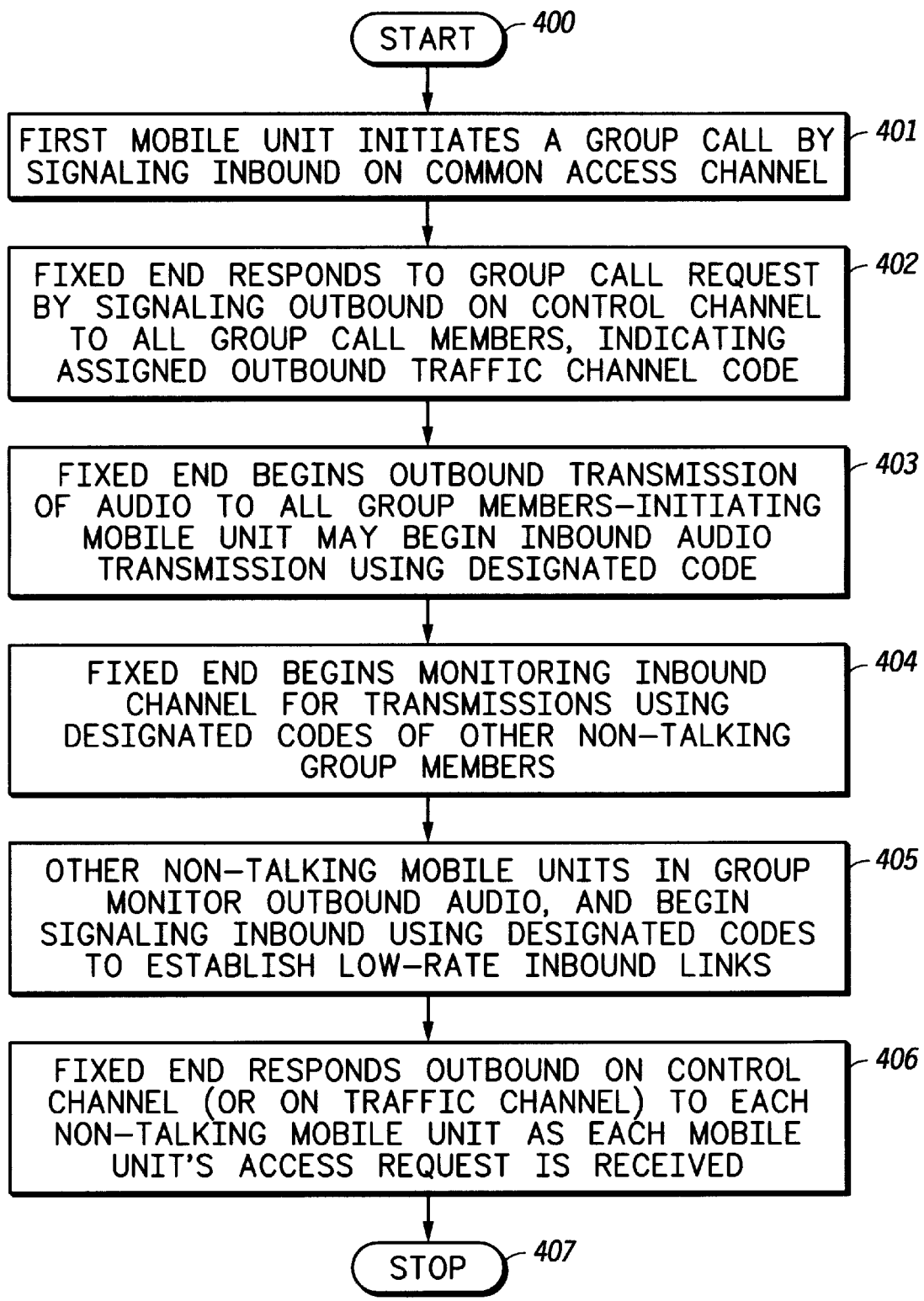
FIG. 4 is a flow chart illustrating a third illustrative embodiment of the present invention.

FIGS. 3 and 4 show alternative preferred embodiments for providing yet better fast call access in a heavy user dispatch environment. Unlike the embodiment of FIG. 1 where inbound links are established prior to beginning of voice communications, the establishing of multiple reverse links will now be described where a CDMA dispatch call occurs as a background process while beginning the voice communications immediately.

Referring to FIG. 3, a mobile unit (subscriber unit 104–109) initiates a group call by sending inbound signaling which identifies that the call is a group call, and which identifies the group (301). The fixed infrastructure 103 notifies all members of the talkgroup of the code on which the voice communications will occur (302), and the voice communications are begun immediately (303). As the conversation progresses, the group members which are in listening mode signal inbound to the fixed end (304) and establish their low rate signaling links (305, 306). The establishment of these links may occur using the same link establishment method as is used in standard cellular communications, i.e., access-probe signaling on a common inbound access channel. It should be noted that because the non-talking mobile units will be trying to establish a link at substantially the same time, they will need to signal inbound, in contention fashion, until the inbound link is established. It is noted that contention algorithms are well known in the CDMA art and form no part of the present invention.

In an alternate embodiment shown in FIG. 4, low-rate signaling links may be established by each mobile unit signaling inbound to the fixed end using its own designated codes, similar to transmission that would be used for an established call. As in the embodiment shown in FIG. 3, a subscriber unit 104–109 initiates a group call by sending inbound signaling which identifies that the call is a group call, and which identifies the group (401). The fixed end notifies all members of the group of the code on which the voice communications will occur (402), and the voice communications are begun immediately (403). Since the fixed end knows the designated codes for all members of a group, it may monitor the inbound channel for codes corresponding to group members (404), rather than receiving their responses on the common inbound access channel. Other non-talking subscriber units in the talkgroup monitor outbound audio, and begin signaling inbound using their designated, preassigned, unique codes to establish the low-rate signaling links (405). The fixed end 103 responds outbound on a control channel or on the full-rate traffic outbound link (i.e., the traffic channel) to each non-talking subscriber unit as each unit's access request is received.

This latter method has the advantage that it avoids contention on the common access channel by multiple units. However, it requires the fixed end to monitor a potentially large number of codes, increasing the processing requirements for the fixed end.

It was explained in connection with FIGS. 3 and 4 that in establishing the low-rate signaling links the fixed end 103 may, since it knows the designated codes for all members of a group, monitor the inbound channel for codes corresponding to group members (404). Alternatively, it was proposed that links may be established by having the fixed end 103 receive requests for establishing appropriate links, over the common inbound access channel. It is further contemplated that either scheme may be employed in the first illustrative embodiment discussed in connection with FIG. 2 regarding establishing low-rate links prior to the beginning of the voice communications in a setup group call, in substantially the same manner.

Figure 5:
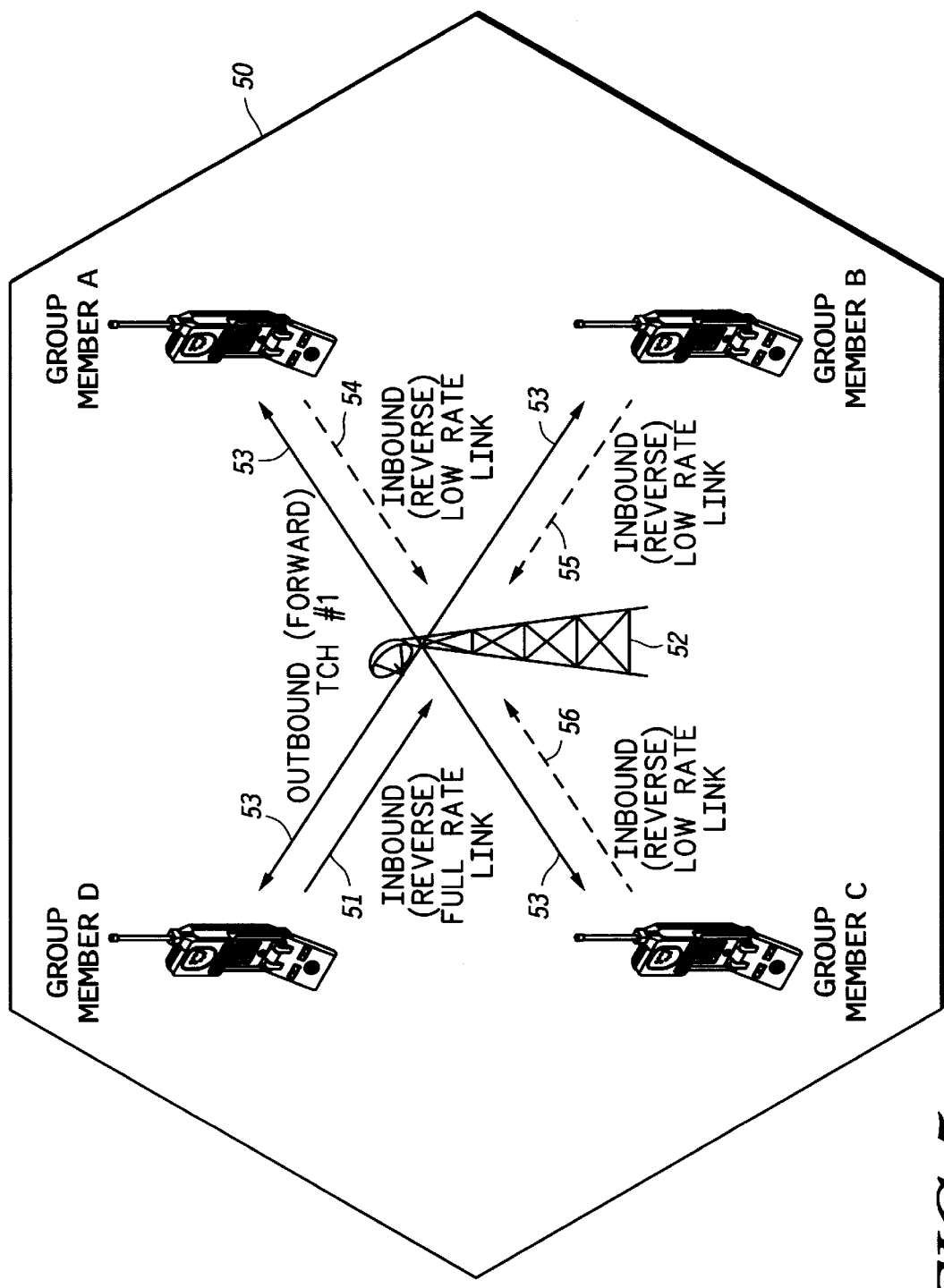
FIG. 5 shows an exemplary four member talkgroup (Group members A–D) CDMA dispatch service operating within a single cell site, in accordance with the present invention.

FIG. 5 shows an exemplary four member talkgroup (Group members A–D) cooperatively coupled for dispatch communication within a single cell site 50. Shown is a first group member D currently transmitting a signal (voice, data, etc.) over an inbound (reverse) full rate link 51 to the base station (BTS) 52 serving the site. All the talkgroup members (A–D) are set up to monitor the outbound (forward) full-traffic link 53 from the base station 52. The non-talking members A–C are linked to the base station 52 via low-rate inbound links 54–56, respectively. The establishment of the inbound links 54–56 allows for fast follow-up call setup by a on-talking group member wishing to talk using the full-rate inbound link 51. It should be noted that the talkgroup members could be geographically dispersed across multiple sites instead, as originally shown in FIG. 1. This requires that appropriate (full-rate/low-rate) inbound and outbound links be established substantially as in the single site illustration of FIG. 5.

It should be appreciated that the establishment of links as a background process enables the dispatch service to have fast call setup time which is a requirement of a quality dispatch service, since the necessary inbound (reverse) signaling links are established quickly. The links provide for soft hand-off, reverse and forward power control, and the setup in the background allows for initial fast call setup.

While the present invention has been particularly shown and described with reference to particular embodiments thereof, it will be understood by those skilled in the art that various changes in form and details may be made therein without departing from the spirit and scope of the present invention.

We claim:

1. In a CDMA dispatch communication system comprising a fixed infrastructure and a plurality of subscribers units engaged in a group call wherein at least a plurality of group members, including a second group member, are listening to the group call on the same outbound link from the fixed infrastructure, and wherein a first group member is transmitting a signal on an inbound link to the fixed infrastructure, a method of establishing multiple low-rate inbound links comprising the fixed infrastructure performed steps of:

detecting a request by the subscriber unit of the first group member for a group call;

establishing a full-rate traffic inbound link with the subscriber unit of the first group member for transmitting a signal to the fixed infrastructure;

establishing a full-rate traffic outbound link with the subscriber units of each of the at least a plurality of group members so they can receive the signal from the fixed infrastructure; and prior to transmitting the signal from the first group member to the fixed infrastructure, establishing for each the at least a plurality of group members, including the second group member, a low-rate inbound link, different from said full-rate traffic inbound link, for receiving at least one of forward power control information, soft hand-off information and reverse power information therefrom.

2. The method of claim 1, wherein the step of establishing inbound links with each group member involves identifying a unique code associated with a corresponding subscriber unit.

3. The method of claim 2, wherein the step of identifying a unique code associated with a corresponding subscriber unit involves selecting the unique codes from an associated talkgroup list of codes.

4. The method of claim 2, wherein the step of identifying a unique code associated with a corresponding subscriber unit involves receiving code information from the subscriber unit of each group member wishing to participate in the group call.

5. The method of claim 1, wherein the step of establishing low-rate inbound links with each of the at least a plurality of group members involves monitoring the low-rate inbound links while the full-rate inbound link is active.

6. In a CDMA dispatch communication system comprising a fixed infrastructure and a plurality of subscribers units engaged in a group call wherein at least a plurality of group members, including a second group member, are listening to the group call on the same outbound link from the fixed infrastructure, and wherein a first group member is transmitting a signal on an inbound link to the fixed infrastructure, a method of establishing a low-rate inbound link, the method comprising the subscriber unit performed steps of:

receiving notification from the fixed infrastructure that a group call is being setup;

establishing a full-rate traffic outbound link for monitoring signals transmitted from the fixed infrastructure; and prior to receiving the signal from the fixed infrastructure on the full-rate traffic outbound link, establishing a low-rate inbound link, different from said full-rate traffic inbound link, for communicating at least one of forward power control information, soft hand-off information and reverse power information to the fixed infrastructure.

7. The method of claim 6, wherein the step of establishing an inbound link involves sending by the subscriber unit a unique code associated therewith used for encoding the information sent over the associated low-rate inbound link.

8. The method of claim 6, wherein when the second group member detects that the first group member has stopped transmitting, the second group member transmits a signal over the fixed infrastructure to the other group members using a full-rate inbound link.

9. A fixed infrastructure for facilitating CDMA dispatch service among a plurality of subscribers units engaged in a group call wherein at least a plurality of group members, including a second group member, are listening to the group call on the same outbound link from the fixed infrastructure when a first group member is transmitting a signal on an inbound link to the fixed infrastructure, the fixed infrastructure comprising:

means for detecting a request by the subscriber unit of the first group member for a group call;

means for establishing a full-rate traffic inbound link with the subscriber unit of the first group member;

means for establishing a full-rate traffic outbound link with the subscriber units of each of the other group members so they can receive the signal from the first group member; and means for establishing for each of said at least a plurality of group members, including the second group member, and prior to transmitting the signal from the first group member to the group members, a low-rate inbound link, different from said full-rate traffic inbound link, for receiving at least one of forward power control information, soft hand-off information and reverse power information from each group member.

10. The fixed infrastructure of claim 9, wherein the means for establishing inbound links with each group member includes means for identifying a unique code associated with a corresponding subscriber unit.

11. The fixed infrastructure of claim 10, wherein the means for identifying a unique code associated with a corresponding subscriber unit involves selecting the unique codes from an associated talkgroup list of codes.

12. The fixed infrastructure of claim 10, wherein the means for identifying a unique code associated with a corresponding subscriber unit involves receiving code information from the subscriber unit of each group member wishing to participate in the group call.

13. The fixed infrastructure of claim 9, wherein the means for establishing low-rate inbound links with each group member includes means for monitoring the low-rate inbound links while the full-rate inbound link is active.

14. A subscriber unit for use with a CDMA dispatch communication system having a fixed infrastructure providing dispatch service among a plurality of subscribers units engaged in a group call wherein at least a plurality of group members, including a second group member, are listening to the group call on the same outbound link from the fixed infrastructure when a first group member is transmitting a signal on an inbound link to the fixed infrastructure, the subscriber unit comprising:

means for receiving notification from the fixed infrastructure that a group call is being setup;

means for establishing a full-rate traffic outbound link for monitoring signals transmitted from the fixed infrastructure; and means for establishing a low-rate inbound link, different from said full-rate traffic inbound link, and prior to receiving the signal from the fixed infrastructure on the full-rate traffic outbound link, for communicating at least one of forward power control information, soft hand-off information, and reverse power information to the fixed infrastructure.

15. The subscriber unit of claim 14, wherein the means for establishing inbound links includes means for sending a unique code associated with the subscriber unit and used for encoding the information sent over the associated low-rate inbound link.

* * * * *